April 26, 1966  H. L. BARTELT  3,247,643
MACHINE FOR FORMING A SKIN PACKAGE
Filed Aug. 20, 1962  4 Sheets-Sheet 1
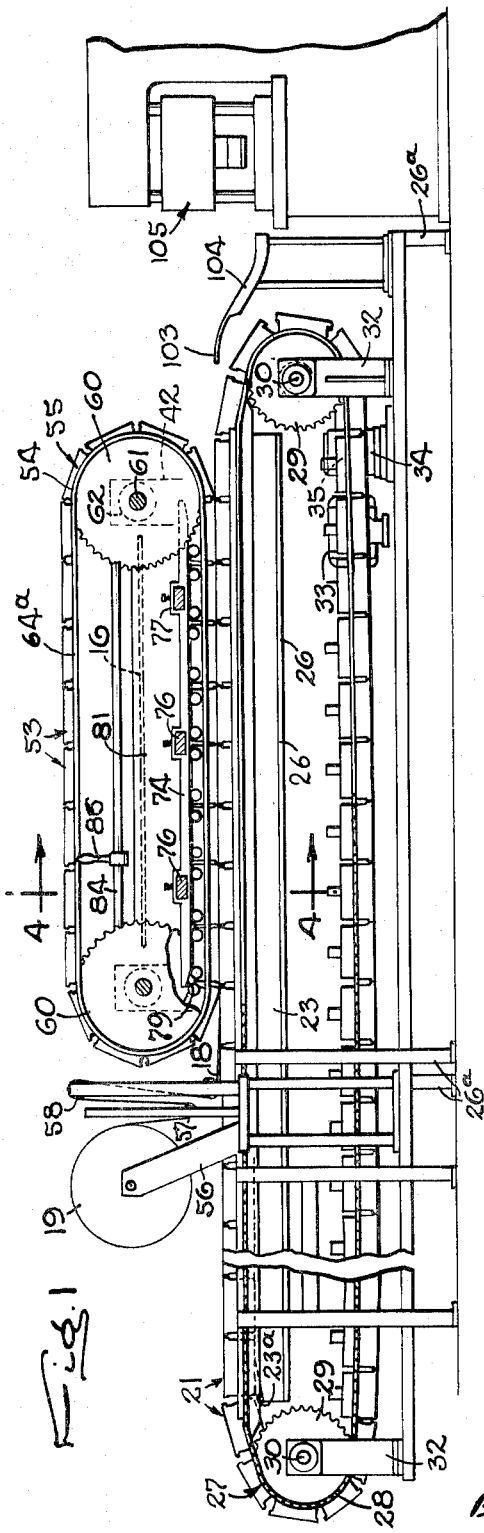
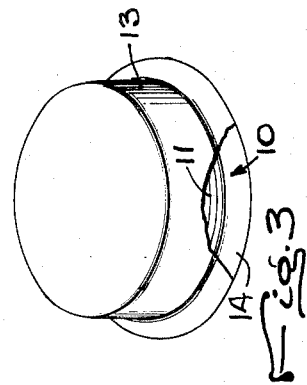
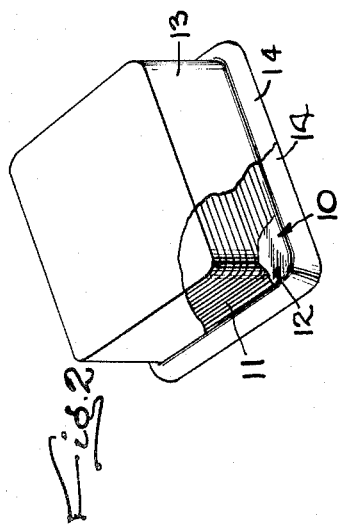
INVENTOR
Harold L. Bartelt,
Deceased
Dora G. Bartelt,
Executor
By Wolfe, Hubbard, Voit & Osann
ATTORNEYS

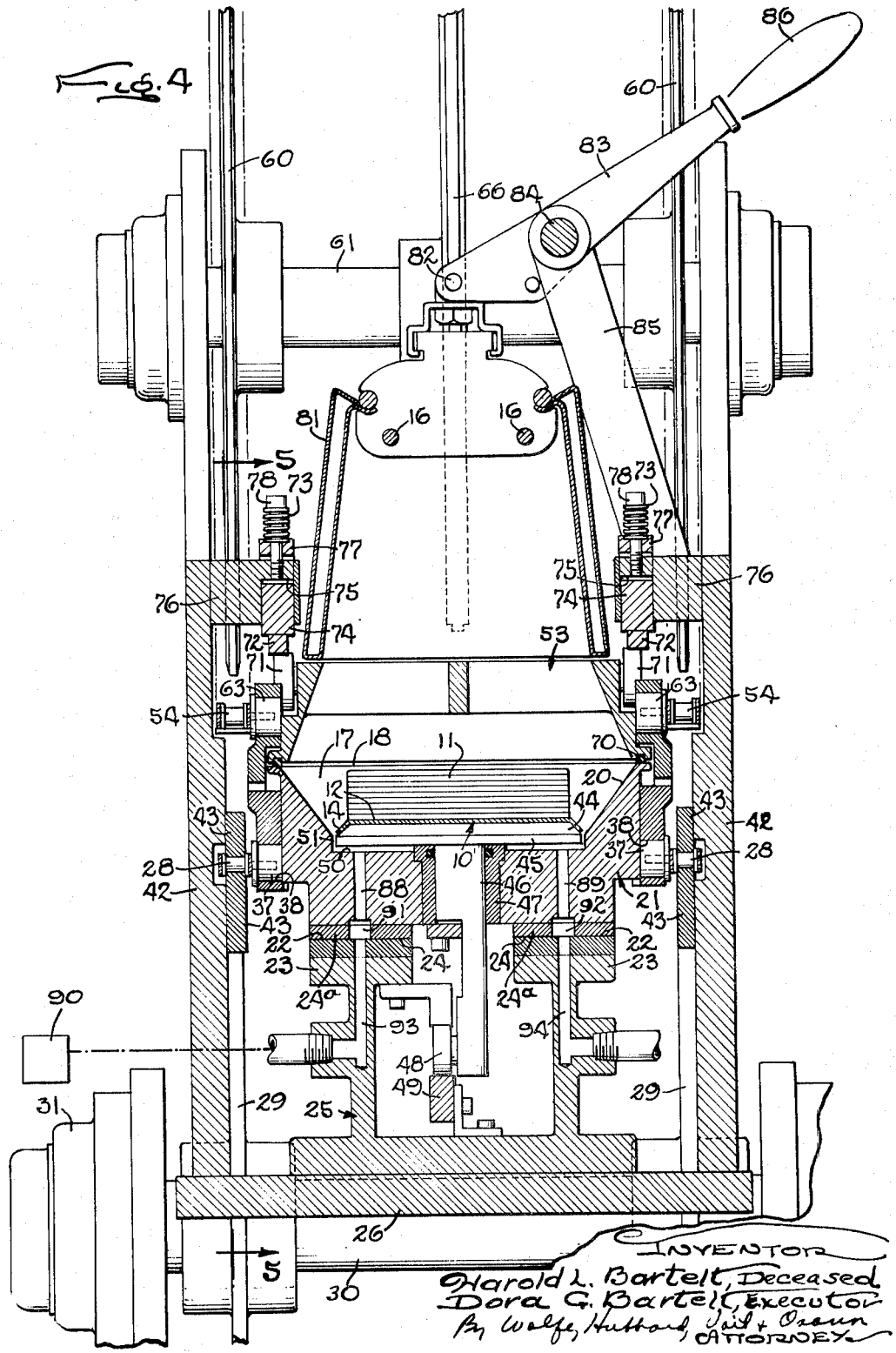

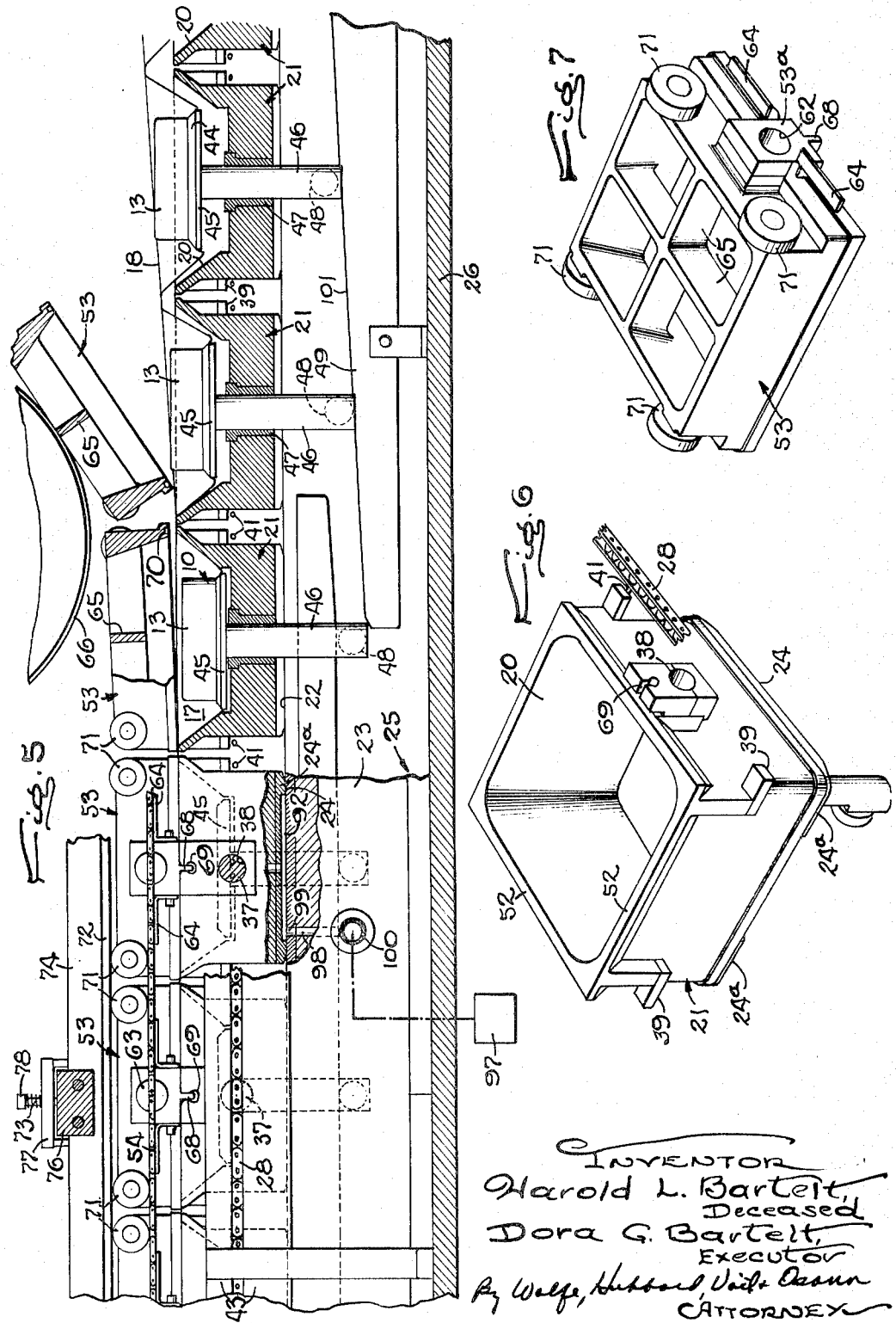

April 26, 1966  H. L. BARTELT  3,247,643
MACHINE FOR FORMING A SKIN PACKAGE
Filed Aug. 20, 1962  4 Sheets-Sheet 4
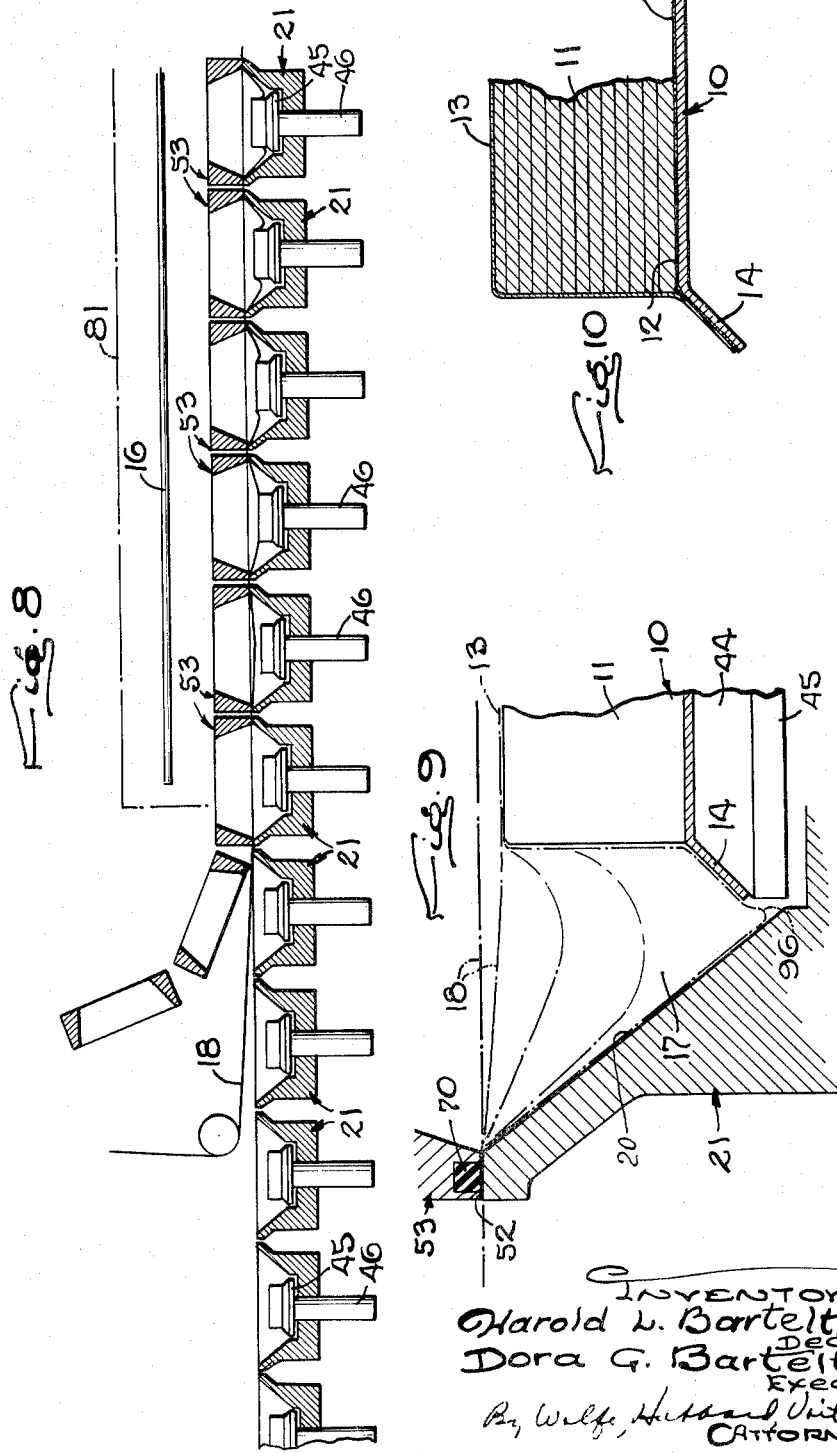

3,247,643
MACHINE FOR FORMING A SKIN PACKAGE
Harold L. Bartelt, deceased, late of Rockford, Ill., by Dora G. Bartelt, executrix, 815 Overlook Road, Rockford, Ill.
Filed Aug. 20, 1962, Ser. No. 218,172
17 Claims. (Cl. 53—112)

This invention relates to the so-called skin-packaging of articles by enclosing the same between a base and a film of thermoplastic material drawn downwardly over and around the article by creating a vacuum on one side of the film and beneath the base while the film is heated to a plastic state.

The primary object is to provide an improved machine and process utilizing a vacuum in a novel manner to form a skin package having an impervious base with a downwardly and outwardly flaring skirt and a thermoplastic film stretched down over and in skin-like contact with an article on the base and sealed to said skirt.

Another object is to draw the film into skin-like contact with the article and utilize a vacuum to seal the film against the peripheral surface of a base supporting the article.

A more detailed object is to achieve the sealing of the film to the base by supporting the latter and the article in a chamber covered by the plastic film and applying the vacuum to the bottom portion of the chamber to thereby draw the film downwardly over and around the article and past the periphery of the base into sealing contact therewith.

Another object is to correlate the size and shape of the base with that of the article and the walls of the vacuum chamber so as to insure proper sealing of the film against the entire periphery of the base automatically as an incident to the draping of the plastic film around the base.

A further object is to utilize the improved vacuum draping and sealing method in a novel manner which leaves the package filled with an inert gas such as nitrogen.

Still another object is to control the positioning of the article within the vacuum chamber in a novel manner so as to assure close fitting of the plastic film over the top of the article.

A further object is to provide a novel means for holding the plastic film so as to effectively close the vacuum chamber while the film is being draped around the article.

Another object is to provide a machine for forming skin packages of the above character from a continuously advancing film.

Other objects and advantages of the invention will become apparent from the following detailed description taken in connection with the accompanying drawings, in which FIGURE 1 is a fragmentary side elevational view of a package forming machine for carrying out the present invention.

FIGS. 2 and 3 are perspective views of packages formed in accordance with the present invention.

FIG. 4 is a fragmentary section taken along the line 4—4 of FIG. 1.

FIG. 5 is a fragmentary sectional view taken along the line 5—5 of FIG. 4 but broken away to show sections in other planes.

FIGS. 6 and 7 are perspective views of parts of the machine.

FIG. 8 is a schematic view showing the successive steps in the assembly and formation of the package.

FIG. 9 is an enlarged fragmentary section of the package showing successive steps in its formation.

FIG. 10 is a fragmentary cross-section of the finished package.

As shown in FIGS. 2, 3 and 10, the improved skin package comprises an impervious fairly rigid base 10 supporting the packaged article, a stick 11 of round or rectangular slices of meat in this instance, corresponding in peripheral size and shape to the top 12 of the base and a thin film 13 of thermoplastic material draped and stretched down over the article in skin-like contact therewith and also with a downwardly flaring skirt 14 on the base to which the film is sealed to enclose the article in a completely sealed chamber. Any remaining space within the package may be left evacuated or filled with inert gas such as nitrogen.

While the base may be formed of a single plastic material capable of adhering to the film 13 while the latter is heated and softened into a plastic state, it preferably comprises a sheet of cardboard covered with a thin adhering coating 15 of a thermoplastic material which is compatible with the plastic of the film 13 and renders the base impervious or gas proof. Preferably the laminated material is converted into the base 10 by conventional die-cutting and forming operations. Among the materials currently available and suitable for use as the film 13 and the coating 15, are saran, saran coated cellophane, laminations of cellophane and Pliofilm, and a material manufactured by Riegel Paper Company and sold under the trade name Drapex II.

It is important to note that the periphery of the top 12 of the base conforms approximately in size and peripheral shape with the maximum peripheral contour of the article 11 to be packaged. If the article is generally square as in FIG. 2, the area of the top of the base is made square and similarly sized. If the article is circular as shown in FIG. 3, the base is correspondingly rounded.

In forming the improved skin-package, the base 10 with the article 11 supported in centered relation thereon is supported in horizontal position within a chamber 17 substantially larger in horizontal area than the base and closed by a top wall formed by a sheet 18 of the film material substantially larger than and centered relative to the base and disposed horizontally and spaced above the top of the article as shown in FIG. 4. After the film has been softened and rendered plastic by heat radiated downwardly from suitable heaters 16, a vacuum is created in any suitable manner in the bottom portion of the chamber whereby to draw the softened film down through the successive positions illustrated in FIG. 9 thus draping the film down over and stretching the same around the article to bring the same into full sealing contact with the outwardly facing and plastic coated surface of the skirt 14 around the entire periphery thereof.

The invention is practiced in a machine for forming successive skin packages of the above character from a length of the strip 13 of the film material drawn from a roll 19 and advanced continuously along a horizontal path. To this end, the chambers 17 in which the successive packages are formed are defined by the internal walls 20 of upwardly opening cups 21 (FIG. 6) linked together end to end in an endless loop 27 having an upper run whose cups rest on and slide along upper way surfaces 22 on laterally spaced horizontal rails 23 joined together to form an elongated channel 25 supported by a frame member 26 extending along substantially the full length of the machine and supported on legs 26a. The machined way surfaces engage the under surfaces 24 of bars 24a secured to the bottom of each cup.

As shown in FIGS. 4 and 6, the cups 21 comprise substantially square castings somewhat deeper and substantially larger than the ultimate package and disposed in closely spaced edge to edge relation between two endless chains 28 which mesh with and run around sprockets 29. The latter are fast on shafts 30 journaled in bearings 31 on the upper ends of standards 32 on the machine base. One shaft is driven continuously by an electric motor 33 operating through reduction gearing 34 to drive a shaft 35 chain coupled to the sprocket shaft and turn the sprockets clockwise so as to advance the upper horizontal row of cups to the right as viewed in FIGS. 1 and 5.

Pivot pins 37 (FIGS. 4 and 5) fixed to the sides of the chains 28 project inwardly and are seated in sockets 38 in opposite sides of the cups thus holding the cups in proper end to end relation. Downwardly facing feet 39 at the corners of the cups bear against pins 41 rigid with and projecting laterally from the chains thus holding the cups in line while they are traversing the lower run of the conveyor and approaching the left ends of the rails 23 which may be inclined at 23a (FIG. 1) to guide the cups onto the rails. Laterally spaced plates 42 (FIG. 4) rigid with and upstanding along opposite sides of the frame member 26 support vertically spaced bars 43 which provide horizontal guideways in which the chains 28 are seated and along which they ride to define the upper run of the conveyor.

The upper run extends to the left beyond the supply roll 19 leaving a number of the cups 21 open to receive the articles to be packaged, these being loaded into the individual cups manually or by suitable automatic mechanism with the article seating and properly centered on the base 10. In the course of the loading, the skirt 14 of the base is guided by the downwardly converging internal side wall 20 into a centered position in which the skirt telescopes down over the downwardly flaring periphery 44 of a horizontal platform 45. The latter comprises a flat plate corresponding in shape to and adapted to fit closely into the bottom of the base 10. A rigid stem 46 depending from the platform projects slidably down through a sealed bearing 47 in the bottom of the cup. At its lower end, the stem carries a roller 48 constituting the follower of an elongated cam 49 fixed to the channel 25 and extending along the discharge end portion of the loop 27. In its lowermost position, the platform 45 is disposed in a recess 50 in the bottom of the cup providing a clearance 51 (FIGS. 4 and 9) about 1/32 of an inch wide around the entire periphery of the platform.

The film roll 19 is supported by a standard 56 (FIG. 1) and the film, as led off from the roll, extends around tension maintaining rolls 57 and is guided by a roll 58 into the plane of the lips 52 of the cups then moving in a horizontal row along the ways 22 and through the various package forming positions. The sheet of film covering each cup is clamped tightly against the lips by open frames or pressure platens 53 arranged end to end and linked together by endless chains 54 to form an endless loop 55 substantially shorter than the cup loop 27 and disposed above and in the plane of the latter beyond the roll 19 and short of the discharge end of the cup loop. The chains 54 mesh with sprockets 60 on shafts 61 journaled in bearings 62 supported by the side plates 42 of the machine frame. The frames comprise generally square castings (FIG. 7) having blocks 53a secured to opposite sides thereof and recessed at 62 to receive pivot pins 63 secured to the inner sides and spaced along the chains. While traversing the horizontal portions of the loop 55, the frames are held against tilting relative to the chains by angle bars (FIG. 7) secured to opposite sides of the frame and on opposite sides of the pivot recesses 62 and having flanges 64 which bear against the upper or return flight 64a of the chains 64 thus preventing tipping of the frames. In traveling around opposite ends of the loop, the inner surfaces of webs 65 (FIG. 7) of the frame bear against and are backed by the outer periphery of rubber covered wheels 66 (FIGS. 4 and 5) fast on the sprocket shafts 61.

After each frame has moved downwardly around the left end of the loop 55 and as it comes into vertical alinement with one of the cups 21, the outer ends of lugs 68 (FIGS. 5 and 7) on the under sides of the blocks 53a swing down along opposite sides of the cup and the ends of the lugs enter upwardly opening sockets 69 on opposite sides of the cup and remain seated during advance of the assembly along the horizontal path during which the package is formed. In this way, each cup and its associated frame are in effect doweled into precise centered relation or axial alinement with a length of the film disposed between the cup lip 52 and a compressible gasket 70 set into the bottom of the frame and extending around the entire periphery thereof. Thus, each cup chamber 17, covered by the film 18 and with the article 11 disposed therein, is closed effectually and so maintained while the package is being formed during the remaining travel of the cup and frame assembly along the horizontal run of the loop. Also, by doweling the frames and the cups together automatically as the two loops 27 and 55 come together beyond the film roll 19, the two loops are coupled together positively and synchronized movement of the cups and frames is maintained throughout the range during which the package is formed.

To seal the film tightly against the lips 52 of the cups during formation of the package, rollers 71 (FIGS. 4 and 7) journaled on opposite sides of the frames 53 bear against the under sides of tracks 72 (FIGS. 1, 4 and 5) extending along the horizontal run of the loop 55 and urged downwardly by coiled springs 73. The tracks 72 are on bars 74 bodily movable vertically in guide notches 75 formed in brackets 76 which project inwardly from the frame bars 42 (FIG. 4). Yokes 77 secured to the bars at spaced points along the latter straddle the brackets and are urged downwardly by the compression springs 73 which encircle headed studs 78 threaded into the brackets. In the movement of the frame downwardly around the left end of the loop, the rollers 71 on each frame come beneath the inclined left ends 79 of the track bars 74 after the lugs 68 have started to enter the notches 69 on the associated cup. Then, as the frame continues along the track, the springs 73 become effective to urge the frame downwardly and compress the gasket 70 and the film 18 against the lip 52 of the cup.

To soften the exposed area of the film 18 covering each cup and render the same plastic for response to the vacuum which is created within the bottom of the cup to drape the film down over the article 11, heat is radiated downwardly through the openings in the frames 53 and against the tops of the film sheets covering the successive cups. For this purpose, the heaters 16 above referred to may comprise so-called Colrod units disposed within and extending along a reflecting hood 81 supported within the frame loop 55 at the proper distance above the cups advancing along the horizontal path where the packages are formed. Herein, the hood is suspended at 82 from the end of a lever 83 fulcrumed at 84 on a stationary link 85 and adapted, by operating a handle 86, to be raised to move the hood into and out of operative position (FIG. 4).

It is desirable in the packaging of certain articles, particularly foods such as meat, to insure the complete removal of air from the interior of the final package. To this end, the invention contemplates, as a preliminary to drawing the softened film downwardly around the article, displacing the air within the cup chamber 17 and below the softened film 18 with an inert gas such, for example as nitrogen. Herein, this is accomplished by forcing the gas under pressure from a source 90 into the lower part and on one side of the chamber through an inlet passage 88 (FIG. 4) while an outlet passage 89 on the opposite side of the chamber is left open to the atmosphere or connected to a suitable vacuum source. Such admission is controlled by the registry of slots 91 and 92 (FIGS. 4 and 5) formed in and extending along the bottoms of the bars 24ᵃ on the cup with ports at the upper ends of passages 93 and 94 communicating respectively with the nitrogen source 90 and the atmosphere. While the ports and slots are in register usually for a period of about a half second determined by the lengths of the slots, nitrogen at a selected pressure flows into the bottom of the cup and upwardly through the clearance space 51 on one side of the platform 45 thus purging the space around the article 11 of air which is forced out of the chamber 17 through the space 51 on the opposite side of the chamber and the passage 94. The extent of the purging may be controlled by varying the sizes of the passageways, the lengths of the slots 91, 92, the speed of advance of the cups, and the pressure of the nitrogen.

As each cup approaches and moves beyond the air purging position, the film 18 covering the lip thereof is subjected to heat radiated downwardly through the open frame 53 from the heaters 16 and softened to a relatively plastic state. In this condition of the film, provision is made for draping the softened film downwardly over and around the article 11 and creating a vacuum in the lower portion of the cup to draw the film into sealing contact with the plastic coating on the outer surface of the skirt, the two surfaces becoming bonded together effectually over a relatively wide band and around the entire periphery of the skirt. While such relative movements between the film and the base 10 may be achieved in other ways, it is preferred to effect the same by creating a vacuum magnitude and duration in the bottom of the cup to draw the softened film rapidly and downwardly through the successive positions shown in phantom in FIG. 9. In this action, the outer peripheral portion of the plastic sheet rolls downwardly along the inner wall 20 of the cup while the central portion comes into contact with the top of the article and the surrounding area becomes draped around the sides of the article and then across the outer surface of the skirt 14. When application of the vacuum is interrupted, a narrow band 96 (FIG. 9) of the film is drawn into the clearance space 51 somewhat below the lower edge of the skirt and the periphery of the platform 45. Effective sealing of the film to the downwardly flaring surface of the skirt 14 is best achieved by converging the inner cup wall 20 downwardly as shown at an angle of about forty degrees relative to the horizontal.

The vacuum to effect the desired sealing action is applied to the cup chamber by a suitable preferably continuously operating vacuum pump 97 communicating through a pipe 100 with a passage 98 (FIG. 5) extending upwardly through one flange of the channel 25 and terminating at a port 99 in one of the way surfaces 22 for registry with the corresponding slot 92 in the bottom of the advancing cup. The vacuum applied is of such magnitude that in the interval of its application as determined by the length of the slot 92 and the speed of the cup, the softened film will be drawn downwardly between the wall 20 and the article 11 approximately to the lowermost position shown in FIG. 9.

Shortly beyond the position at which the slot 92 passes beyond the port 99, the frames 53 start to swing upwardly and away from the cups and around the sprockets 60 as illustrated in FIG. 5. About the same time, the follower roller 48 on the stem of the platform 45 comes into engagement with the upper surface (FIG. 5) of the cam bar 49. Then, in the continued advance of the cup, it rides up the incline 101 thus raising the platform 45, the packaged article and the surrounding area of the film 18 within the cup as illustrated in FIG. 5 so as to facilitate stripping of the package and the film out of the forming cup by the ends 103 of laterally spaced stationary rails 104. The plastic film with the finished package still integral therewith slides downwardly along these rails as the cups 21 swing downwardly in traveling with the sprockets 29 so that the packaged articles still attached to the film 18 are lifted out of the cups by the rails. The film and attached packages slide downwardly along the rails to a suitable mechanism 105 operable periodically and in timed relation to the advancing film to punch out the packaged article and separate the same from the remainder of the film.

It will be apparent from the foregoing that the article 11 supported on the base 10 is enclosed in a film sealed tightly around the periphery of the impervious base, all in a succession of operations which are executed while the film is advancing continuously, for example at a speed of 420 inches per minute so as to produce sixty packages. Also, the completed package may be left filled with an inert gas or in partially evacuated condition, this being accomplished by proper correlation of various factors including the speed of travel and degree of softening of the film by the heaters 16, and the magnitude and duration of application of the vacuum. The use of the depending and flaring skirt 14 on the package base 10 facilitates nesting of the packages one above the other and holding the same in the form of a stock on a display counter.

What is claimed is:

1. In a machine of the character described, the combination of, a pair of laterally spaced endless chains forming a loop having vertically spaced horizontal runs, a series of cups disposed in end to end relation between said chains with opposite sides of the cup pivotally connected to said chains, said cup along the upper horizontal run opening upwardly, means for advancing said cups around said loop, a second pair of laterally spaced endless chains shorter than and disposed above said first chain and forming an endless loop shorter than said first loop and disposed intermediate the ends thereof with a lower horizontal run spaced above and extending alongside the upper horizontal run of said first loop, a series of open frames disposed between and pivotally connected on opposite sides to said second chains, and spaced along the latter to aline and come into abutment with the lips of the successive cups along the horizontal runs of the two loops, means for coupling the successive cups to said associated frames to move the latter in unison with the cups, means for laying a sheet of thermoplastic film across the lips of said cups in approaching said frame loop whereby to provide a closed chamber in each cup, means for radiating heat downwardly through said frames and against the film covering the successive cups whereby to soften the film, means within the cups for supporting articles to be packaged and deposited in the successive cups before the latter are covered by said film, and means communicating with the lower portions of said chambers and operable to evacuate the same momentarily whereby to draw the softened film into the cup and drape the same around the article therein.

2. A package forming machine as defined in claim 1 including horizontal rails slidably supporting said cups during movement thereof along the horizontal run of said first loop, and means yieldably pressing said frames downwardly to seal said film against the lips of said cups.

3. A package forming machine as defined in claim 1 including horizontal rails slidably supporting said cups during movement thereof along the horizontal run of said first loop, a bar disposed above said frames and extending along the lower run of said frame loop for engagement with the frames while in abutment with said cups, and means yieldably urging said bar downwardly to press the moving frames against said cups and seal the film against the lips thereof.

4. A package forming machine as defined in claim 1 including horizontal rails slidably supporting said cups during movement thereof along the horizontal run of said first loop, said evacuating means including a passage extending through the bottom of each cup and ports in said rails and the bottoms of the cups adapted to be brought into and out of registry during the advance of the cups and frames whereby to determine the periods of evacuation of the successive cups.

5. A package forming machine as defined in claim 1 including members on opposite sides of said cups and said frames bearing against the associated chains ahead of and behind the cup and frame pivots whereby to maintain the cups and frames in longitudinal alinement while traversing horizontal runs of said chain loops.

6. For skin-packaging articles on generally flat bases each having a downwardly flaring and imperforate peripheral skirt, the combination of, a row of upwardly opening cups linked together at adjacent ends to form an endless loop conveyor disposed in a vertical plane, means for advancing the conveyor and slidably supporting the cups of the upper run of said conveyor in a horizontal row, platforms in the bottoms of said cups of said row, each telescoped with one of said skirts and supporting one of said bases with one of said articles resting thereon, means operable during the advance of said conveyor to lay a sheet of thermoplastic film across the lips of said cups to cover the same, a heater spaced above the advancing cups and radiating heat to said film to soften the latter, means movable in synchronism with the cups of said row for sealing said film against the cup lips, and means operable during the advance of said row of cups to create a vacuum in the lower portion of the successive cups and thereby stretch the softened film downwardly into the cup and finally into sealing contact with the peripheral surface of said skirt.

7. For skin-packaging articles on generally flat bases, the combination of, a row of upwardly opening cups linked together at adjacent ends to form a conveyor, means slidably supporting said cups and advancing the same along a horizontal path, platforms each mounted within one of said cups for up and down movement relative to the cup and supporting one of said bases with one of said articles resting thereon, means operable during the advance of said conveyor to lay a sheet of thermoplastic film across the lips of said cups to cover the same, means for maintaining said film clamped against the cup lips whereby to close the chambers defined by the cups, a heater spaced above the advancing cups and radiating heat to said film to soften the latter, means operable momentarily to create a vacuum in the lower portion of the cup and thereby stretch the softened film downwardly into the cup along the internal wall thereof and around the article on said platform, and means subsequently operating in the advance of the evacuated cup to raise said platform relative to said cup and thereby strip the film away from the cup wall.

8. For skin-packaging articles, the combination of, a row of open ended cups linked together at adjacent edges to form an endless loop having an upper horizontal run along which the cups travel while opening upwardly, power actuated means for moving the cups of said loop unidirectionally, means in each cup for receiving and supporting an article during travel of the cup along said horizontal run, means operable to lay a sheet of thermoplastic film across the lips of said cups whereby to close the same, a row of open frames corresponding in size to the lips of said cups and linked together to form an endless loop shorter than said first loop having a lower horizontal run with the frames thereof in vertical alinement with the cups and with the frames in abutment with the lips of the respective cups during advance of said horizontal runs in unison, means operable during such advance to apply a yielding downward pressure against said frames whereby to clamp said sheets against and seal the same around the cup lips, means for radiating heat downwardly through said frames during their advance whereby to soften the sheets to a plastic state, and subsequently operating means for creating a vacuum in the lower portion of each cup and cause the softened sheet to be drawn into the cup and draped down over the article therein.

9. A package forming machine as defined in claim 8 in which said means for pressing said frames downwardly includes tracks facing downwardly and overlying and engaging said frames to press the same into abutment with said cups during travel of the two along said horizontal runs.

10. A package forming machine as defined in claim 8 including means for coupling each of said cups to one of said frames as the two come together in the advance of said loops.

11. A package forming machine as defined in claim 8 in which said means for pressing said frames downwardly includes tracks facing downwardly and overlying and engaging said frames to press the same into abutment with said cups during travel of the two along said horizontal runs, including means supporting said tracks for up and down movement and spring means urging said tracks downwardly to press the same against said frames and in turn against said cups.

12. A package forming machine as defined in claim 8 including elements on said frames and cups providing a lug and a notch for receiving the lug as a cup and frame come together in the advance of said loops.

13. In a machine for skin-packaging an article on a generally flat base having a downwardly and outwardly flaring skirt extending continuously around the periphery of the base, the combination of, a cup having a lip for supporting a sheet of thermoplastic film to close the cup, a hollow frame clamping said sheet against said cup lip, means for radiating heat to the outer side of said sheet through said frame for softening the film to a plastic state, a platform in the bottom of said cup nested within said skirt and supporting said article in the central portion of the cup bottom, the internal wall of said cup converging downwardly and inwardly from said lip and cooperating with said skirt to form a chamber extending around the entire periphery of the skirt, and means for creating a momentary vacuum in said chamber below said skirt and of sufficient magnitude to draw the softened film into said cup and downwardly along said wall and the outer periphery of said article and skirt whereby to seal the film to the surface of the skirt.

14. A packaging machine of the character described in claim 13 including means operable before the application of said vacuum to purge the interior of each cup of air and fill the same with an inert gas.

15. A packaging machine as defined in claim 13 in which said internal wall is inclined at an angle of about 40 degrees relative to the axis of said cup.

16. A packaging machine as defined in claim 13 including means supporting said platform for movement upwardly in said cup to raise the completed package and strip the surrounding film off from said cup wall.

17. In a machine for skin-packaging an article on a base having a downwardly and outwardly flaring skirt larger than the article and extending continuously around the periphery of the base, the combination of, a cup having a lip for supporting a flat sheet of thermoplastic film to close the cup, means clamping said sheet against said cup lip to seal the cup closed while leaving the outer surface of the film exposed within said lip, means for radiating heat to said exposed outer side for softening the film to a plastic state, means in the bottom of said cup for supporting said article within the central portion of the cup bottom, said sheet, the internal wall of said cup coacting to form a chamber around said article and skirt, and said internal wall around the supported base converging downwardly past the lower edge of the skirt and adjacent such edge, and means for creating a momentary vacuum in said chamber below said skirt and of sufficient magnitude to draw the softened film into said cup against the top of said article and drape the same downwardly around the side of said article and across the downwardly flaring surface of said skirt whereby to seal the film to such surface around the full periphery thereof.

References Cited by the Examiner

UNITED STATES PATENTS

| | | | |
|---|---|---|---|
| 2,400,390 | 5/1946 | Clunan | 206—46 |
| 2,442,161 | 5/1948 | Bergstein | 53—22 |
| 2,852,133 | 9/1958 | Bonini et al. | 206—46 |
| 2,927,409 | 3/1960 | Heyer | 53—112 X |
| 2,942,390 | 6/1960 | Lerner | 53—22 |
| 2,976,658 | 3/1961 | Kostur | 53—113 |
| 3,000,157 | 9/1961 | Ollier et al. | 53—184 |
| 3,035,382 | 5/1962 | Lemelson | 53—184 |
| 3,071,905 | 1/1963 | Morse | 53—22 |
| 3,129,545 | 4/1964 | Sloan et al. | 53—112 |
| 3,130,101 | 4/1964 | Gittins et al. | 53—22 X |

TRAVIS S. McGEHEE, *Primary Examiner.*

DOUGLAS J. DRUMMOND, *Examiner.*